US008537960B2

(12) United States Patent
Kwon et al.

(10) Patent No.: US 8,537,960 B2
(45) Date of Patent: Sep. 17, 2013

(54) AUTOMATED CLEANING EQUIPMENT AND METHOD FOR THE NUCLEAR FUEL-CLADDING TUBE

(75) Inventors: Ki-jun Kwon, Daejeon (KR); Jeong-ho Kim, Daejeon (KR); Se-yong Shin, Daejeon (KR); Hung-soon Chang, Daejeon (KR); Tae-hyung Na, Daejeon (KR); Jong-sung Hong, Daejeon (KR)

(73) Assignee: Korea Nuclear Fuel Co., Ltd., Daejeon (KR)

( * ) Notice: Subject to any disclaimer, the term of this patent is extended or adjusted under 35 U.S.C. 154(b) by 467 days.

(21) Appl. No.: 12/644,877

(22) Filed: Dec. 22, 2009

(65) Prior Publication Data

US 2010/0195783 A1 Aug. 5, 2010

Related U.S. Application Data

(62) Division of application No. 11/466,500, filed on Aug. 23, 2006, now abandoned.

(30) Foreign Application Priority Data

Jun. 16, 2006 (KR) .......................... 10-2006-0054405

(51) Int. Cl.
*G21C 19/42* (2006.01)
(52) U.S. Cl.
USPC .......................................... 376/310; 376/308
(58) Field of Classification Search
USPC ................................................ 376/310–311
See application file for complete search history.

(56) References Cited

U.S. PATENT DOCUMENTS

| 4,762,253 | A | * | 8/1988 | Palmert ...................... 222/145.2 |
| 4,852,404 | A | * | 8/1989 | Catanese ........................ 73/319 |
| 6,866,171 | B2 | * | 3/2005 | Ickinger ........................ 222/596 |
| 2006/0016461 | A1 | * | 1/2006 | Buckwitz et al. ................. 134/8 |
| 2006/0179946 | A1 | * | 8/2006 | Wilson ............................ 73/570 |

FOREIGN PATENT DOCUMENTS

| JP | 2003-194977 | 7/2003 |
| JP | 2005-114513 | 4/2005 |

* cited by examiner

*Primary Examiner* — Jack W Keith
*Assistant Examiner* — Marshall O'Connor
(74) *Attorney, Agent, or Firm* — Rabin & Berdo, P.C.

(57) ABSTRACT

Disclosed is an apparatus for performing an automated cleaning of nuclear fuel cladding-tubes. The apparatus comprises a pre-cleaning holding section disposed at a first side of the apparatus, a primary cleaning-material supplying section and a primary cleaning section disposed at a second side of the apparatus, a secondary cleaning section and a secondary cleaning material supplying section disposed at the second side of the apparatus and beside the primary cleaning section, an inspection section disposed at a third side of the apparatus that is opposite to the second side, and a post-cleaning holding section disposed at the fourth side of the transferring section. The pre-cleaning holding section and the post-cleaning holding section includes a cladding-tube guide where the cladding-tube is loaded before and after cleaning. Primary and secondary cleaning material supply sections are disposed at a lateral side of the primary and secondary cleaning sections respectively.

3 Claims, 12 Drawing Sheets

US 8,537,960 B2

AUTOMATED CLEANING EQUIPMENT AND METHOD FOR THE NUCLEAR FUEL-CLADDING TUBE

CROSS-REFERENCE TO RELATED APPLICATIONS

This a Divisional application of U.S. application Ser. No. 11/466,500 filed Aug. 23, 2006, which claims priority from Korean Patent Application No. 10-2006-0054405, filed Jun. 16, 2006, in the Korean Intellectual Property Office, the entire contents of which is incorporated herein by reference.

BACKGROUND OF THE INVENTION

1. Field of the Invention

The present invention relates to an apparatus for and method of performing an automatic cleaning of nuclear fuel-cladding tubes, more specifically to an apparatus for and a method of automatically cleaning nuclear fuel-cladding tubes, in which a cleaning material is automatically prepared and sprayed to efficiently clean the inside of the nuclear fuel-cladding tube.

2. Background of the Related Art

Nuclear fuel is manufactured under high temperature and pressure conditions using uranium compounds. The nuclear fuel is enclosed by aluminum or magnesium cladding such nuclear waste generated from nuclear fission is prevented from being mixed with coolant and leaked to the outside. In case of a PWR (pressurized water reactor), a low-enriched uranium dioxide powder is compacted and sintered into cylindrical yellowish brown pallets, which are stacked one on another inside a thin tube made of zircaloy (Zr—Sn alloy containing a light amount of Cr and Fe) and both ends of the tube are sealed. This metallic tube containing fuel pallets stacked thereinside is called a "fuel rod", and the tube is called a fuel cladding tube.

The fuel rod is loaded into a structure to form a fuel bundle assembly. In case of the fuel for the Korean Standard Nuclear Power Pant, about 177 fuel bundle assemblies are loaded into the reactor and used for around 4 years. This fuel rod is a core component of the nuclear fuel, and the cladding tube for this fuel rod must be treated and maintained under very clean environment.

However, before nuclear fuel pellets are put into the cladding tube, the cladding tube may contain dust, stain, moisture or the like thereinside. In this case, these may affect operation of the nuclear reactor. In particular, in case of moisture, it is decomposed into hydrogen, which may affect the nuclear fission reaction, and thus the moisture must be removed.

Therefore, a cladding tube cleaning must be performed during the manufacturing process for nuclear fuel rods.

In the conventional cleaning process, an appropriate amount of cladding tubes are put on a working station and a worker inserts manually a wool plug wet with ethyl alcohol into the inside of a cladding tube using tweezers and moves up and down the plug. Alternatively, an air gun is used to blow a compressed air to carry out a primary internal cleaning, and then a dry sponge of hexagonal shape is inserted and manually moved back and forth or a compressed air is blown using an air gun to thereby perform a secondary internal cleaning.

In addition, even after the cladding tube cleaning is completed, if a cleaning material remains inside the cladding tube, an accident may be caused. Thus, a visual inspection must be required for the cleaned cleaning tube.

On the other hand, Korean Patent No. 10-0446351 discloses an apparatus for cleaning a cladding tube after use. In this patent, a rotating brush is inserted into the inside of a cladding tube to clean the inside thereof. However, the above technology is not directed to cleaning a cladding tube before use. In addition, this technology is not automated and thus cannot perform a rapid cleaning of a large amount of cladding tubes.

Considering the productivity of nuclear fuel, as many as about 1200 cladding tubes must be cleaned a day. Therefore, in case where a cleaning material is manually pushed into the inside of a cladding tube and an air gun is used to clean the tube, a large quantity of time is required to thereby unable to clean a massive amount of tube and degrade the productivity, and also cause a risk of occurrence of musculoskeletal disease due to the repeated manual work.

The above conventional method of manually cleaning a cladding tube embraces many disadvantages and problems as follows. Firstly, during the process, a cleaning material charge and discharge consumes a lot of time to thereby extend the process time and degrade the efficiency and productivity. Secondly, the tube inspection process after cleaning must be performed one by one for every single cladding tube. Thirdly, the cladding tube must be manually transferred to each working place and the above jobs all must be manually carried out, thereby leading to excessive use of muscles and joints of workers, which may cause diseases in the musculoskeletal systems.

SUMMARY OF THE INVENTION

Therefore, the present invention has been made in order to solve the above problems in the conventional fuel-cladding tube cleaning process, i.e., a decrease in productivity and diseases in the musculoskeletal systems due to manual operation, and it is an object of the present invention to provide an apparatus for and a method of automatically cleaning nuclear fuel-cladding tubes, in which a cleaning material is prepared, automatically injected into and discharged from the fuel-cladding tube, thereby significantly reducing the work time and providing an automation of cleaning.

Another object of the invention is to provide an apparatus for and a method of automatically cleaning nuclear fuel-cladding tubes, in which the cleaned fuel-cladding tube is automatically inspected, thereby significantly reducing the time required for inspection of tubes and maintaining the degree of cleaning to above a certain level.

Still another object of the invention is to provide an apparatus for and a method of automatically cleaning nuclear fuel-cladding tubes, in which the nuclear fuel-cladding tubes are automatically transferred during the cleaning process thereof, thereby preventing diseases in the musculoskeletal systems due to manual operation.

Yet another object of the invention is to provide an apparatus for and a method of automatically cleaning nuclear fuel-cladding tubes, in which multiple processes can be carried out in a single step.

To accomplish the above object, according to one aspect of the present invention, there is provided an apparatus for performing an automated cleaning of nuclear fuel cladding-tubes, the apparatus comprising: a pre-cleaning holding section disposed at one side of a transferring section, the pre-cleaning holding section being composed of a cladding-tube guide where the cladding-tube is loaded before cleaning and waits for cleaning; a primary cleaning-material supplying section and a primary cleaning section disposed at a front side of the transferring section; a secondary cleaning section and a secondary cleaning material supplying section disposed at a front side of the transferring section and at a lateral side of the primary cleaning section; an inspection section disposed at a front side of the transferring section and a lateral side of the secondary cleaning section; and a post-cleaning holding section disposed at the other side of the transferring section, the post-cleaning holding section being composed of a cladding-tube guide where the cladding tube is loaded after cleaning and waits for unloading, wherein the pre-cleaning holding section, the primary cleaning-material supplying section, the primary cleaning section, the secondary cleaning section, the secondary cleaning material supplying section, the inspection section, and the post-cleaning holding section disposed are arranged in the described order, and a primary cleaning material supply section is separately connected to and disposed at a lateral side of the primary cleaning section and a secondary cleaning material supplying section is separately connected to and disposed at a lateral side of the secondary cleaning section.

The primary cleaning section and the primary cleaning material supplying section includes: a cleaning material supplying section having a cleaning material automatic supplying device for automatically aligning and supplying a cleaning material, a cleaning material transferring device connected to the cleaning material automatic supplying device at its terminal end and transferring a cleaning material into a fixed frame of a cleaning section, and a cleaning solution supplying device for spraying a cleaning material combined with the upper side of the fixed frame connected with an end portion of the transferring device; and the cleaning section having an air gun for ejecting a cleaning material by blasting pneumatic pressure from a nozzle, a pneumatic cylinder combined integrally with the air gun and supplying air pressure to the air gun, a pneumatic cylinder combined with the air gun at a lateral side thereof and for advancing and back-warding the air gun, and a fixed frame facing the terminal end of the air gun and having an accommodation space for receiving a cleaning material and a cladding-tube.

The secondary cleaning section and the secondary cleaning material supplying section includes: a secondary cleaning material supplying section having a cleaning material automatic supplying device for automatically aligning and supplying a cleaning material, a cleaning material transferring device connected to the cleaning material automatic supplying device at its terminal end and transferring a cleaning material into a cleaning section; and a secondary cleaning section having an air gun for ejecting a cleaning material by blasting pneumatic pressure from a nozzle, a pneumatic cylinder combined integrally with the air gun and supplying air pressure to the air gun, a pneumatic cylinder combined with the air gun at a lateral side thereof and for advancing and back-warding the air gun, and a fixed frame facing the terminal end of the air gun and having an accommodation space for receiving a cleaning material and a cladding-tube.

The inspection includes a stopper for fixing a cladding-tube so as to be inspected by an optical sensor, and an optical sensor disposed at a lateral side of the cleaning section and inspecting whether a remaining cleaning material exists.

The inspection section interrupts operation of the cladding-tube automatic cleaning apparatus if a cleaning material remains inside of the inspected cladding tube, and transfers the cladding tube to the next process if no cleaning material remains inside of the cladding tube.

The transferring section includes a lateral transferring means in charge of lateral transferring of a cladding-tube and an axial transferring means in charge of axial transferring of a cladding-tube; the lateral transferring means includes a cam device having a cam for moving a cladding-tube to a next process one by one and a follower interlocked with a motor and the cam, and a tube guide disposed in a stepped fashion in an advancing direction of cladding tube, the tube guide being made of a plurality of parallel plates inclined in one direction and serving as a path of the cladding tube; the axial transferring means including a gripper for holding a cladding tube and forwarding and back-warding to a cleaning device and an inspection device, a pneumatic cylinder for forwarding and back-warding the gripper, and a pneumatic cylinder allowing the gripper to hold the cladding tube; the lateral transferring means is disposed respectively between the pre-cleaning holding section and the primary cleaning section, the primary cleaning section and the secondary cleaning section, the secondary cleaning section and the inspection section, and the inspection section and the post-cleaning holding section; and the axial transferring means is disposed so as to face the primary cleaning section and the secondary cleaning section.

According to another aspect of the invention, there is provided an apparatus for performing an automated cleaning of nuclear fuel cladding-tubes, the apparatus comprising: a cleaning material supplying section having a cleaning material automatic supplying device for automatically aligning and supplying a cleaning material, a cleaning material transferring device connected to the cleaning material automatic supplying device at its terminal end and transferring a cleaning material into a fixed frame of a cleaning section, and a cleaning solution supplying device for spraying a cleaning material combined with the upper side of the fixed frame connected with an end portion of the transferring device; and the cleaning section having an air gun for ejecting a cleaning material by blasting pneumatic pressure from a nozzle, a pneumatic cylinder combined integrally with the air gun and supplying air pressure to the air gun, a pneumatic cylinder combined with the air gun at a lateral side thereof and for advancing and back-warding the air gun, and a fixed frame facing the terminal end of the air gun and having an accommodation space for receiving a cleaning material and a cladding-tube.

The apparatus may further comprise a controller disposed between the above elements and controlling the respective elements, the controller including a sensor for detecting approaching of a cladding tube when transferring the cladding tube and sending a signal, and a PLC equipped with a control program.

In the apparatus, a cylindrical cleaning material made of polyurethane is used.

The cleaning material automatic supply device includes a storage container, a piezoelectric element attached to the bottom of the storage container, an aligning passageway formed in an inclined spiral form along the inner wall face of the storage container, and an one-line supply device connected with the aligning passageway to supply in one row a cleaning material coming from the storage container.

The cleaning material transferring device includes: an advancer connected with an end portion of the cleaning material automatic supplying device and having an internal accommodation space for transferring an ink foam one by one into an injection position; and a pneumatic cylinder connected to rear end of the advancer to forwarding and back-warding the advancer.

The cleaning solution supplying device includes a cleaning solution storage barrel, a flow tube connected to the lower portion of the cleaning solution storage barrel to spray cleaning solution from the storage barrel to a cleaning material, and a control valve installed in the intermediate of the flow tube and for controlling the amount of cleaning solution supplied.

According to another aspect of the invention, there is provided a method of automatically cleaning nuclear fuel cladding-tubes, the method comprising: a cleaning material preparation process being carried out in a cleaning material supplying section where a cleaning material is automatically aligned and transferred; and a cleaning process being carried out in a cleaning section where the automatically transferred cleaning material is moved into a cleaning position and the cleaning material is ejected by means of an air gun to clean a cladding tube, wherein the cleaning material preparation process and the cleaning process are performed in the described order.

The method may further comprise an inspection process for inspecting the cleaned state of cladding tube and whether a cleaning material remains in the cladding tube, the inspection process being carried out after the cladding-tube cleaning process.

The cleaning material preparation process and the cleaning process include respectively a primary cleaning material preparation process and a secondary cleaning material preparation process, and a primary cleaning process and a secondary cleaning process, wherein the primary cleaning material preparation process, the primary cleaning process, the secondary cleaning material preparation process, and the secondary cleaning process are carried out in sequence.

The primary cleaning material preparation process includes the steps of aligning ink foam, transferring the ink foam into a cleaning solution supplying device, and soaking the ink foam into the cleaning solution to prepare a wet ink foam; and the secondary cleaning material preparation process includes the steps of aligning ink foam, transferring the ink foam into a cleaning solution supplying device, and not soaking the ink form into the cleaning solution to prepare a dry ink foam.

The inspection process includes the step of transferring the cladding tube to next process if no cleaning material remains inside of the cladding tube, and if a cleaning material remains inside of the cladding tube, interrupting the operation of the cladding-tube automatic cleaning apparatus, removing the remaining cleaning material, and then re-starting the apparatus to transfer the cladding tube to next process.

BRIEF DESCRIPTION OF THE DRAWINGS

The above and other objects, features and advantages of the present invention will be apparent from the following detailed description of the preferred embodiments of the invention in conjunction with the accompanying drawings, in which:

In FIG. 6, the numerical references indicates the followings:

Figure 1:
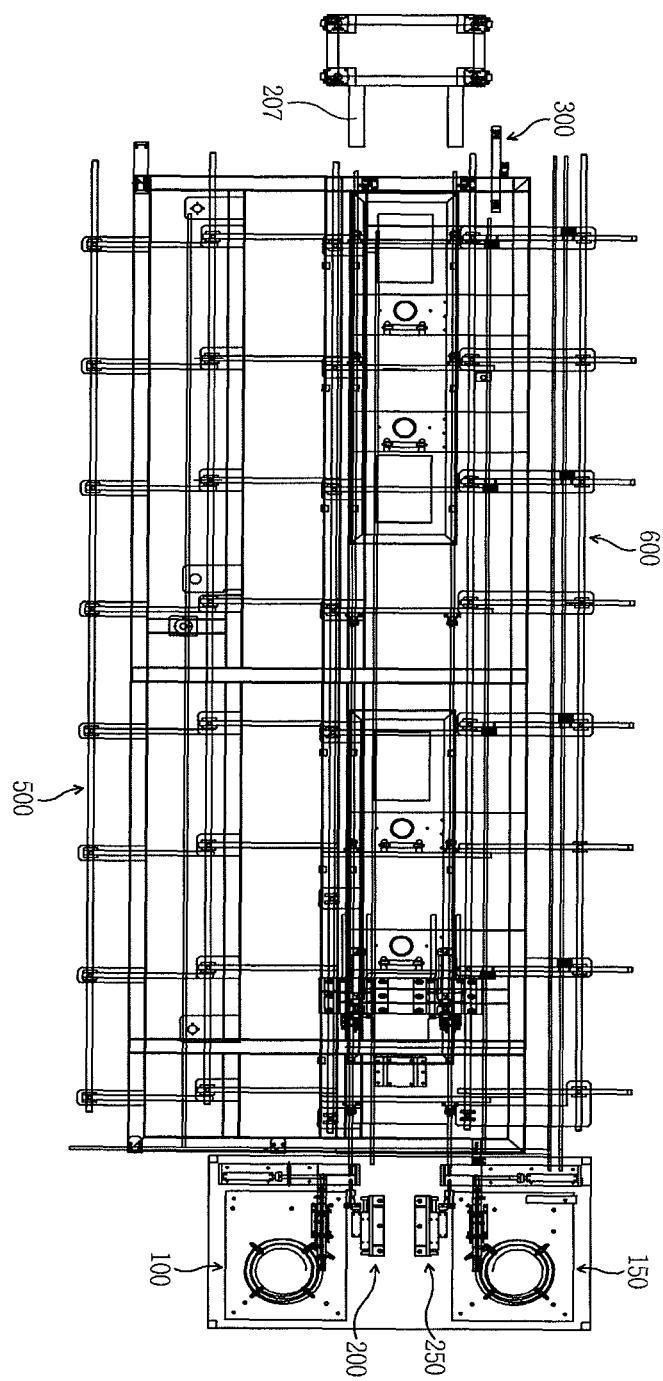
FIG. 1 is a plan view of an automatic cleaning apparatus for nuclear fuel-cladding tubes.

500: Pre-cleaning holding section
100: Primary cleaning material supplying section
200: Primary cleaning section
420: Axial transferring means
150: Secondary cleaning material supplying section
250: Secondary cleaning section
410: Lateral transferring means
300: Inspection section
600: Post-cleaning holding section

DETAILED DESCRIPTION OF THE PREFERRED EMBODIMENT

Hereinafter, an embodiment of the present invention will be described in detail with reference to the accompanying drawings.

FIGS. 1-5 show the construction of an apparatus of automatically cleaning nuclear fuel-cladding tubes according to an embodiment of the invention.

The automated cleaning apparatus of this embodiment includes a pre-cleaning holding section 500 disposed at one side of a transferring section and made of a cladding-tube guide 414. Before cleaning, the cladding-tubes are loaded in the pre-cleaning holding section 500 and wait cleaning. The apparatus includes a primary cleaning section 200 disposed at the front side of the transferring section and a secondary cleaning section 250 disposed at the front side of the transferring section and also at the lateral side of the primary cleaning section 200, and an inspecting section 300 disposed at the front side of the transferring section and also at the lateral side of the secondary cleaning section. The apparatus includes a post-cleaning holding section 600 disposed at the other side of the transferring section and made of a cladding-tube guide 414. After cleaning, the cladding-tubes are loaded into the post-cleaning holding section 600 and wait unloading. In the apparatus of this embodiment, the pre-cleaning holding section 500, the primary cleaning section 200, the secondary cleaning section 250, the inspecting section 300, and the post-cleaning holding section 600 are arranged in the described order. In addition, separately from the above arrangement, a primary cleaning material supplying section 100 is disposed at the lateral side of the primary cleaning section 200, and a secondary cleaning material supplying section 150 is disposed at the lateral side of the secondary cleaning section 250.

In particular, the cleaning material supply section 100 includes a cleaning material automatic supplying device 110 for automatically aligning and supplying a cleaning material 10, a cleaning-material transferring device 120 connected with the cleaning material automatic supplying device at the end portion thereof to transfer the cleaning material into the fixed frame 204 of the cleaning section 200, and a cleaning solution supplying device 130 for spraying a cleaning solution to the cleaning material. The cleaning section 200 includes an air gun 201 ejecting a cleaning material by pneumatic pressure from a nozzle, a pneumatic cylinder 202 supplying pneumatic pressure to the air gun, a pneumatic cylinder 203 for forwarding and back-warding the air gun, and a fixed frame 204 having an accommodation space 208, 209 for receiving a cleaning material and cladding-tubes.

In addition, the automated cleaning apparatus of the invention further includes a control section, which includes a sensor for detecting approaching of a cladding-tube when transferring the cladding-tube and sending a signal, and a PLC embedded with a control program.

Referring to FIGS. 2a to 2e, the cleaning-material supplying section 100 is configured to automatically supply a cleaning material 10, which is used in cleaning of a cladding-tube. The cleaning-material supplying section 100 includes a cleaning-material automatic supplying device 110, a cleaning-material transferring device 120, and a cleaning solution supplying device 130.

Figure 2A:
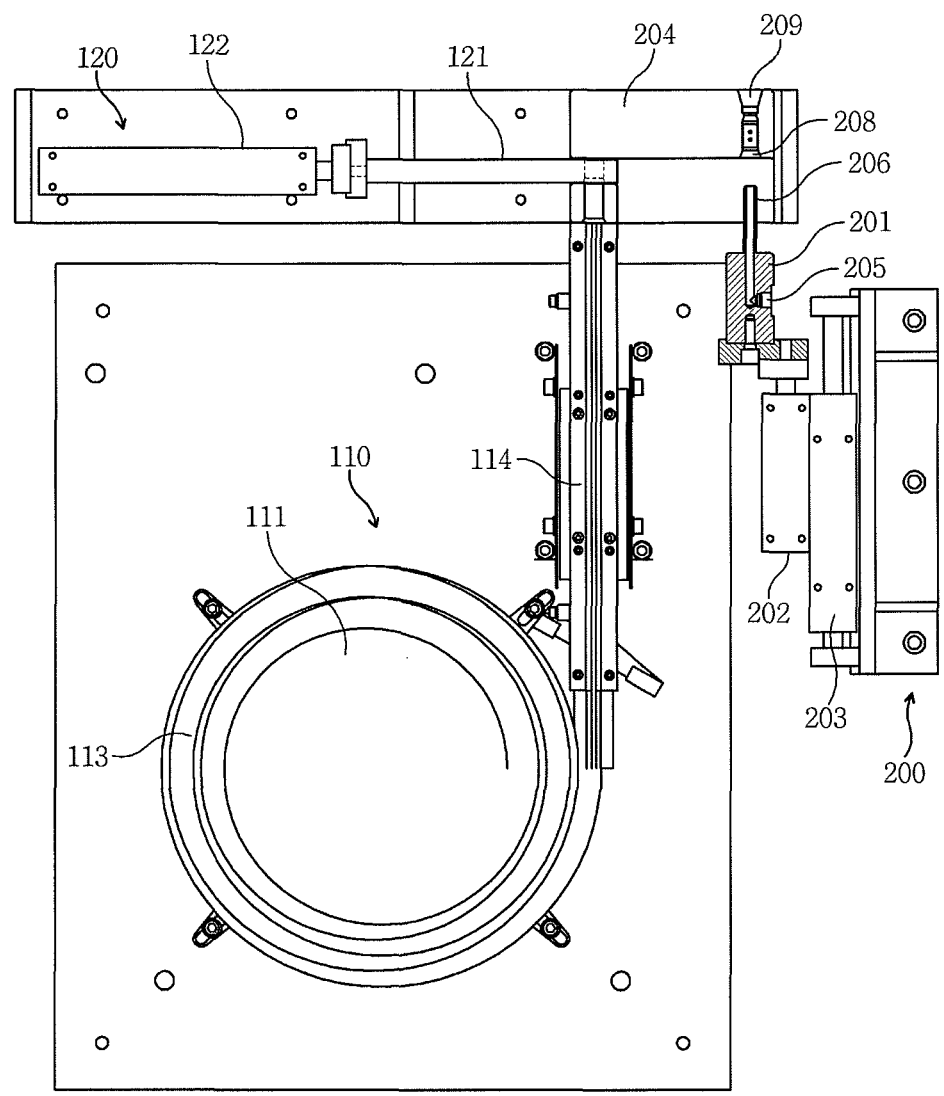
FIG. 2*a* is a plan view showing a cleaning-material supplying section and cleaning area.
Figure 2B:
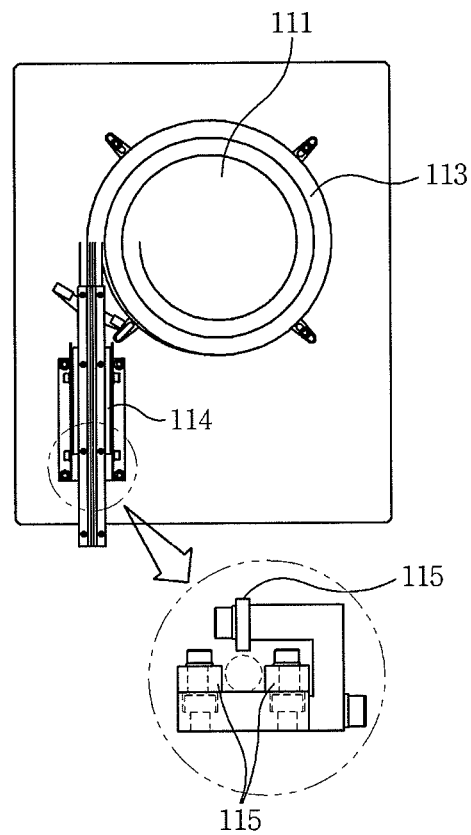
FIG. 2*b* is a plan view and side view showing a cleaning material automatic supplying device.
Figure 2B:
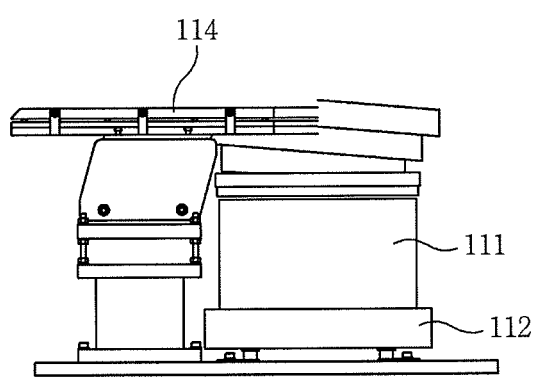

In FIGS. 2a and 2b, the cleaning-material automatic supplying device 110 functions to align and supply the loaded cleaning material 100 for easy use in the cleaning work. The cleaning-material automatic supplying device 110 includes a cylindrical storage container 111, a piezoelectric element 112 attached to underneath of the storage container, an aligning passageway 113 formed in a way to be protruded in a slant spiral form along the inner wall of the cylindrical storage container, and a one-ling supplying device 114 connected with the aligning passageway at the outside of the storage container. The one-line supplying device 114 is a straight passageway and provided with a guide wall 115 installed to the right and left sides and to the upper side of the straight passageway so as to the passing cleaning material.

According to the invention, preferably, the cleaning material 10 is made of a material and shape suitable for an automated process. Thus, the cleaning material is standardized preferably into a cylindrical form (diameter: about 8.5 mm, length: about 15 mm) for easy alignment and transfer, and is made of an ink foam plug of polyurethane so as to absorb a cleaning solution well and provide a good cleaning characteristic. However, the invention is not limited to the shape and material of the above cleaning material.

In FIG. 2b, the reason why the piezoelectric element 112 is employed is that the piezoelectric element is made of fine ceramics using titanate and zirconate as main constituents, and has a piezoelectric effect where voltage and frequency change causes bending of a material. Thus, when applying a change in voltage and frequency, the piezoelectric element 112 oscillates and the storage container 111 also vibrates to cause vibration to the cleaning material 10 stored in the storage container. Thus, the cleaning material 10 moves into the aligning passageway and transfers along the passageway.

Figure 2C:
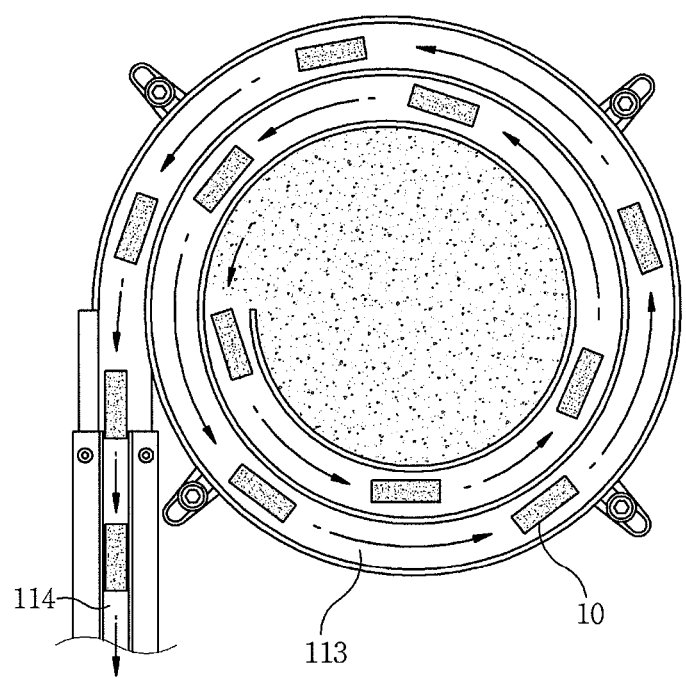
FIG. 2*c* is a plan view showing the operation of a cleaning material automatic supplying device.

Referring to FIG. 2c, the aligning passageway 113 is formed in an inclined spiral form along the inner wall of the storage container. The cleaning material bounces up by means of vibration of the storage container and comes up onto the aligning passageway 113, and slides down in the down slope of the inclined spiral passageway by means of gravity, and, in the upward slope, ascends along the slope by means of the slow slope of the inclined spiral passageway, the pushing force of the following cleaning material 19, the bouncing force when vibrating, and the frictional force on the aligning passageway.

In the one-line supplying device of FIG. 2b, the guide wall 115 blocks the upper side and the right and left side of the cleaning material, which is then forced to advance in one row along the bottom floor.

Figure 2D:
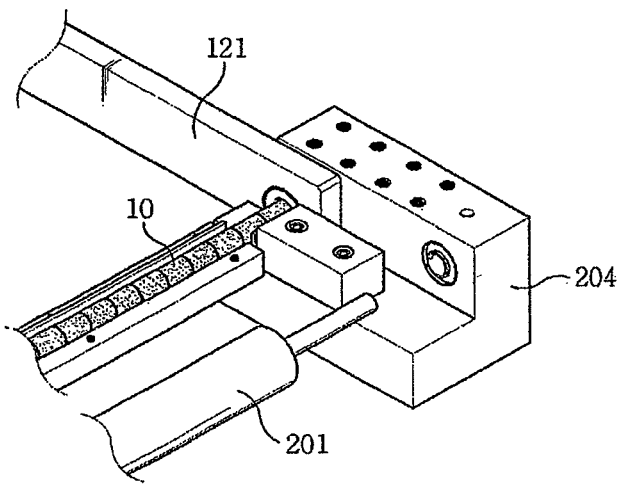
FIG. 2*d* is a plan view showing the operation of a cleaning material transferring device.
Figure 2D:
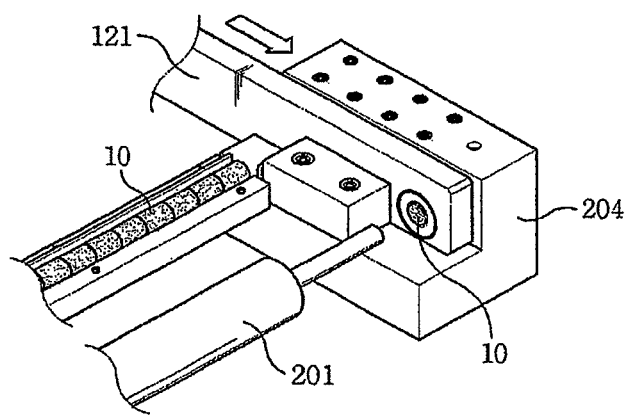
Figure 2D:
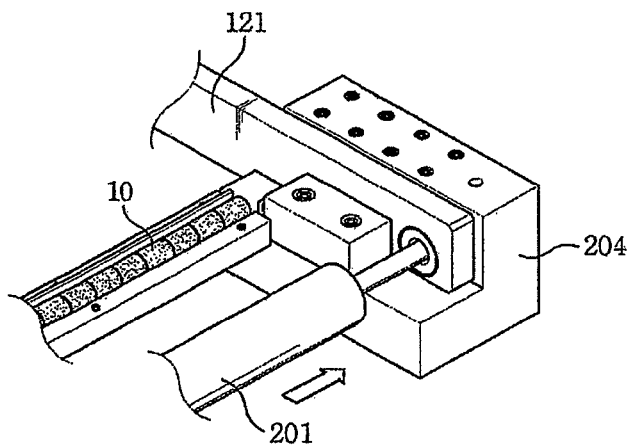

In FIGS. 2a and 2d, the cleaning material transferring device 120 functions to transfer the cleaning material 10 supplied from the cleaning material automatic supplying device 110 to the cleaning solution supplying device and the cleaning section 200. It includes an advancer 121 having a circular accommodation space with a through-hole formed in its central area and a pneumatic cylinder 122 connected to the advancer. The accommodation space of the advancer lies on the extended line from the terminal end of the one-line supplying device 114 and has a size and shape such that the cleaning material supplied from the one-line supplying device in a single row can be accommodated one at a time.

Figure 2E:
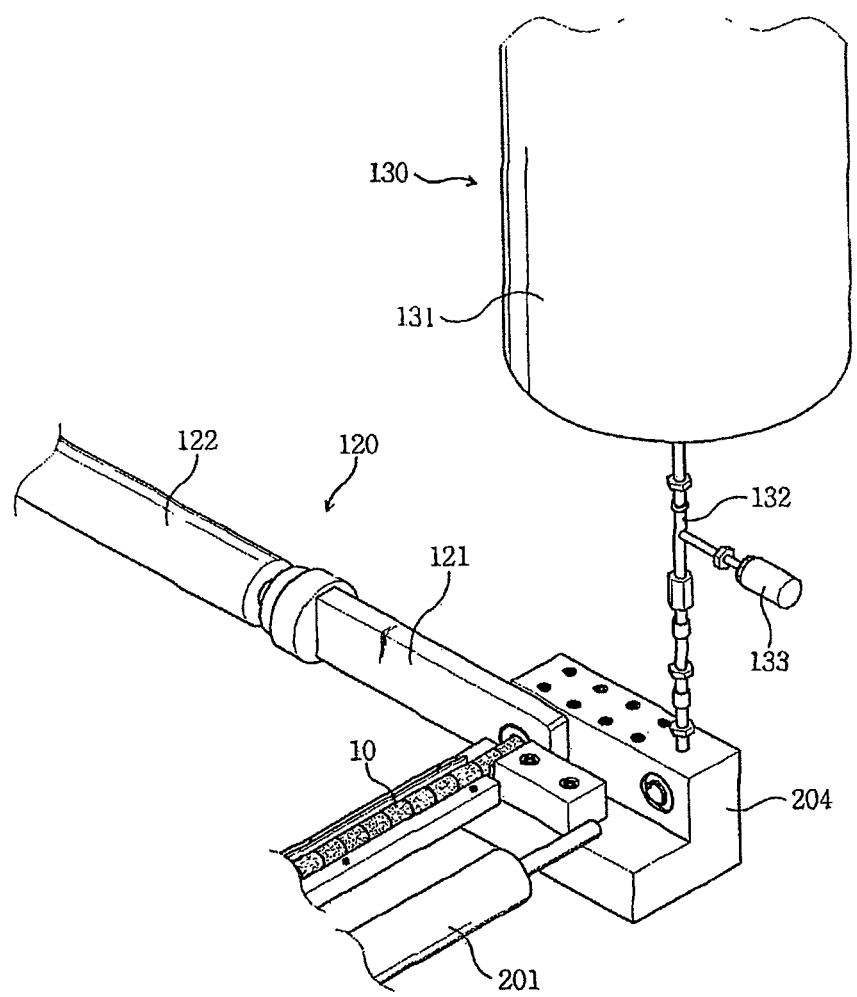
FIG. 2*e* is a perspective view showing a cleaning liquid supplying device and cleaning area.

In FIG. 2e, the cleaning solution supplying device 130 functions to supply a cleaning solution of ethyl alcohol to the cleaning material 10. Formed at the lower portion, which is fixed to a support shaft raised from the working face of the working die, is a discharging hole. The cleaning solution supplying device 130 includes a cylindrical solution storage barrel 131 having a narrowed lower portion, a flow tube 132 one end of which is connected to the lower portion of the storage barrel and the other end of which is connected to a solution injection hole formed in the fixed frame 204 having an accommodation space 208, 209 enable to receive a cleaning material and a cladding-tube, and a control valve 133 connected onto the path of the flow tube.

Figure 3A:
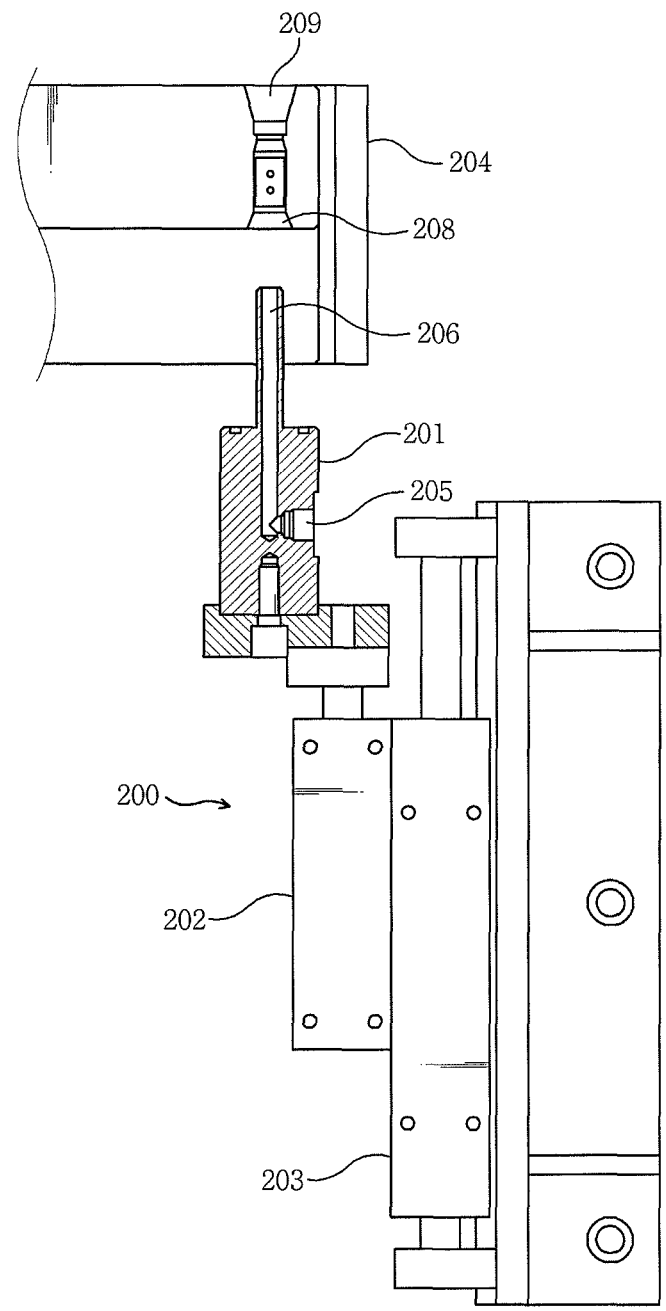
FIG. 3*a* is a sectional plan view showing an air gun before advancing.
Figure 3B:
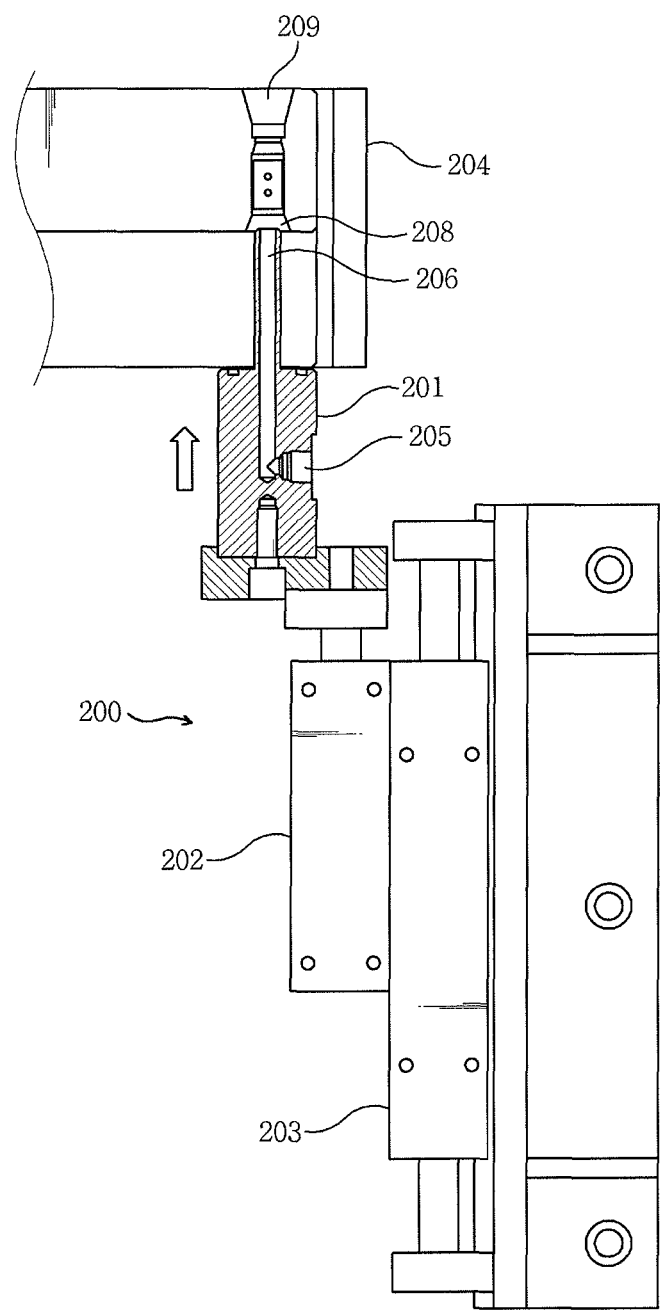
FIG. 3*b* is a section plan view showing an air gun after being advanced.

In FIGS. 3a and 3b, the cleaning section 200 functions to eject a cleaning material 10 using a pneumatic pressure and is formed in such a way that the air inlet hole 205 and air outlet hole 206 are interconnected to each other through a capillary tube. The cleaning section 200 includes an air gun 201 having an outlet hole of an elongated nozzle shape, an ejecting pneumatic cylinder 202 fixed to the air gun and connected to the inlet hole 205 of the air gun by means of a tube, a pneumatic cylinder 203 connected with the ejecting pneumatic cylinder 202 and transferring the ejecting pneumatic cylinder 202 and the air gun 210, and a fixed frame 204 disposed at the terminal side of the air gun nozzle to hold a cladding-tube at the cleaning position and having an accommodation space 208, 209 of the cleaning material and the cladding-tube.

The ejecting pneumatic cylinder 202 supplies an air pressure to the air gun such that the air pressure through the nozzle of the air gun can be sufficient to eject the cleaning material 10 to get through the cladding-tube.

In addition, the fixed frame 204 is provided with an accommodation space 208, 209 for the cleaning material and the cladding-tube. The accommodation spaces 208 and 209 are co-axially connected to each other such that the ejected cleaning material is guided to the inside of the cladding-tube and the cladding-tube and the cleaning material are fixed. More preferably, the cleaning section 200 may include an air gun 202 at the terminal portion of the cladding-tube and an ink foam plug recovery barrel 207 disposed co-axially with the cladding-tube as shown in FIG. 1. Thus, the cleaning material, i.e., the ink foam plug, can be discharged from the cladding-tube and enter the recovery barrel 207.

The cleaning-material supplying section 100 and the cleaning section 200 are divided respectively into a primary cleaning-material supply section 1 and a primary cleaning section 200, and a secondary cleaning-material supplying section 150 and a secondary cleaning section 250, thereby performing a two-pronged cleaning process.

The primary cleaning-material supplying section 100 is different from the secondary one in terms of their configurations. The primary cleaning-material supplying section 100 includes a cleaning solution supplying device 130 for supplying the cleaning material wet with a cleaning solution. On the contrary, the secondary cleaning material supplying section 150 is to supply a dry cleaning material and thus does not include a cleaning solution supplying device 130.

The primary cleaning section 200 and the secondary cleaning section 250 has a similar configuration and respectively includes an air gun 201, two pneumatic cylinders 202 and 203, and a fixed frame 204.

In FIG. 1, the inspection section 300 functions to inspect the cleaned cladding tube as to the remaining cleaning material. The inspection section 300 includes a stopper, which can ascent and descent at the side area of the transferring cladding tube by means of a pneumatic device fixing the cladding tube, and an optical sensor fixed at a place facing both axial ends of the cladding tube, which has gone through the secondary cleaning section. Sine the stopper only has to function to stop the cladding tube rolling down on the inclined surface, it does not need any particular shape, i.e. may be a rectangular block. Thus, it is not illustrated in the figures. The optical sensor is connected to the control section such that inspection results are sent to the control section by means of sending a signal. Such an optical sensor is well known and thus not illustrated.

In the inspection section 300, if no cleaning material remains inside of the cladding tube, the cladding tube is transferred to the next step. If a cleaning material remains, the operation of the automatic cleaning apparatus is interrupted and the cleaning material is removed. Then the apparatus is re-started to transfer the cladding tube to the next process. Thus, the cladding tube is precisely inspected during the process to maintain the high quality of cladding tube.

Figure 4A:
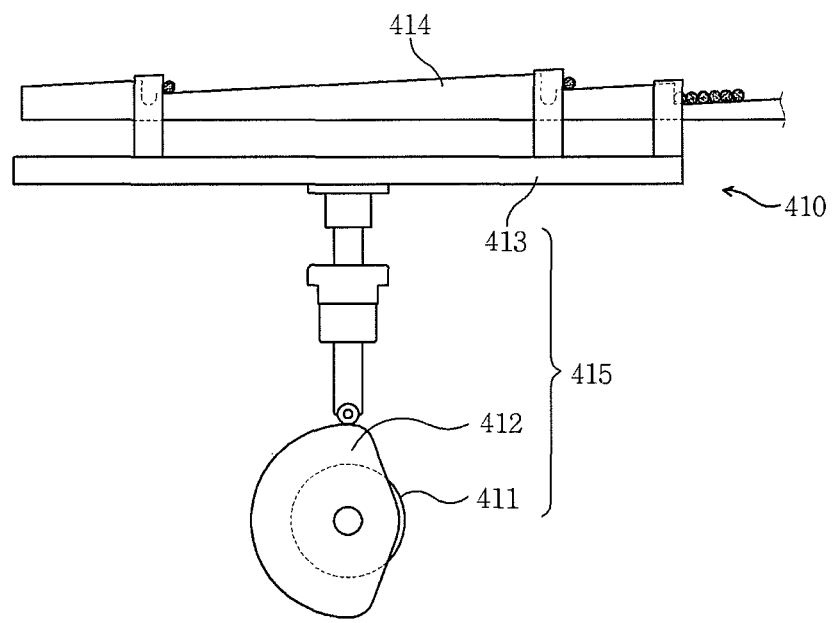
FIG. 4*a* is a schematic view of a lateral-transferring means when the cam is placed at the top dead point.
Figure 4B:
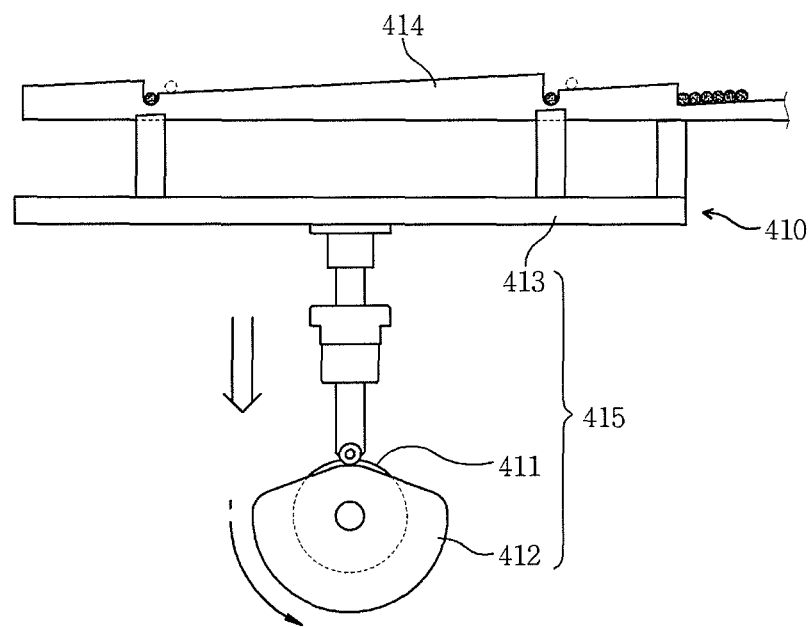
FIG. 4*b* is a schematic view of a lateral-transferring means when the cam is placed at the lowest dead point.
Figure 5:
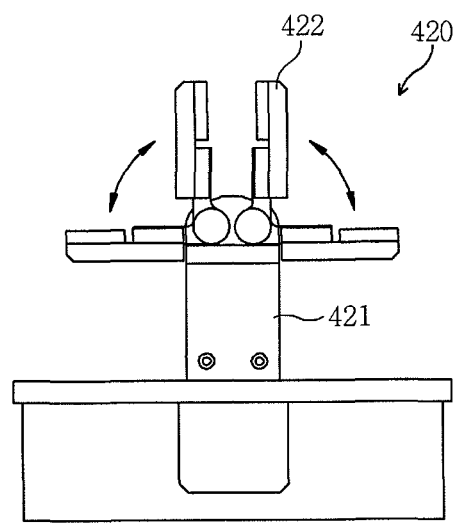
FIG. 5 is a schematic view of an axial-transferring means.
Figure 5:
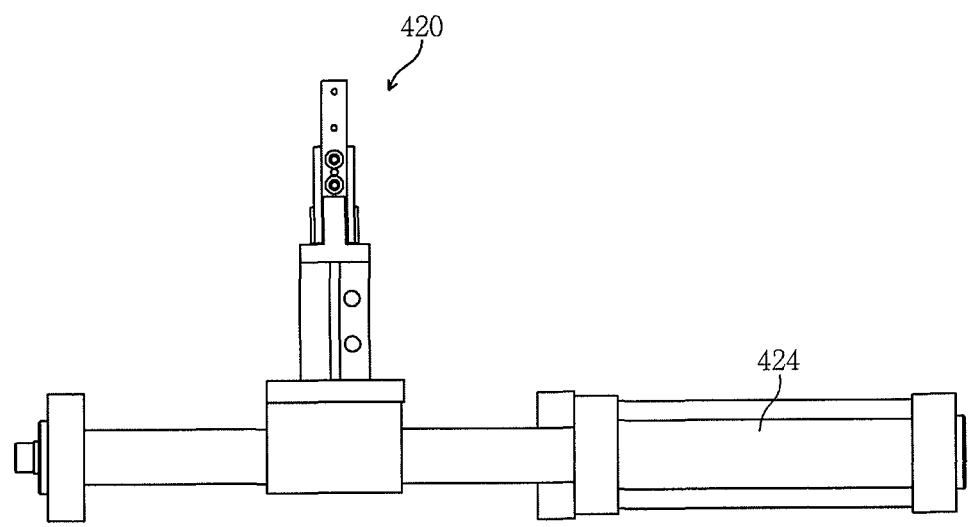

Referring to FIGS. 4a, 4b and 5, the transferring section functions to transfer a cladding tube to each component. The transferring section includes a lateral transferring means 410 for transferring a cladding tube in lateral direction, which is perpendicular to the axial direction of the cladding tube, and an axial transferring means 420 for transferring a cladding tube in the axial direction.

The lateral transferring means 410 includes a cam device having a motor 411 installed at the lower portion of a working station, a cam 412 connected to the shaft of the motor 411 and a follower 413 contacting the cam 412 and interlocked with the cam 412, and a tube guide 414 disposed in a stepped fashion along the advancing direction of the cladding tube. The tube guide 414 includes a plurality of parallel plates, which are inclined in one direction.

As illustrated in FIGS. 4a and 4b, the follower contacts the cam by means of a roller so as to move upward and downward between the top dead point and the lowest dead point by rotation of the cam. The follower 413 is provided with three blocks attached thereto. These blocks move up and down according to the movement of the follower and are disposed in parallel to the lateral transferring direction of the cladding tube. Thus, the blocks are configured so as to ascent simultaneously in the lateral transferring direction.

In FIG. 5, the axial transferring means 420 includes a gripper 421 having an arm 422 branched to the left and right, a pneumatic cylinder (not illustrated because it is regardless of its position) for transferring an air pressure to the arm area of the gripper, and a pneumatic cylinder 424 connected to the lower portion of the gripper body. The arm 422 is combined with the upper portion of the body by means of a hinge respectively (by means of a bearing combining two objects so as to be rotated by means of a surface contact).

The left and right arms 422 of the gripper are configured so as to simultaneously move upwards and downwards. Therefore, the gripper arms, simultaneously rotated to move upwards, can be made to grip a cladding tube. In addition, the gripper arms simultaneously moves downwards to release the cladding tube.

Figure 6:
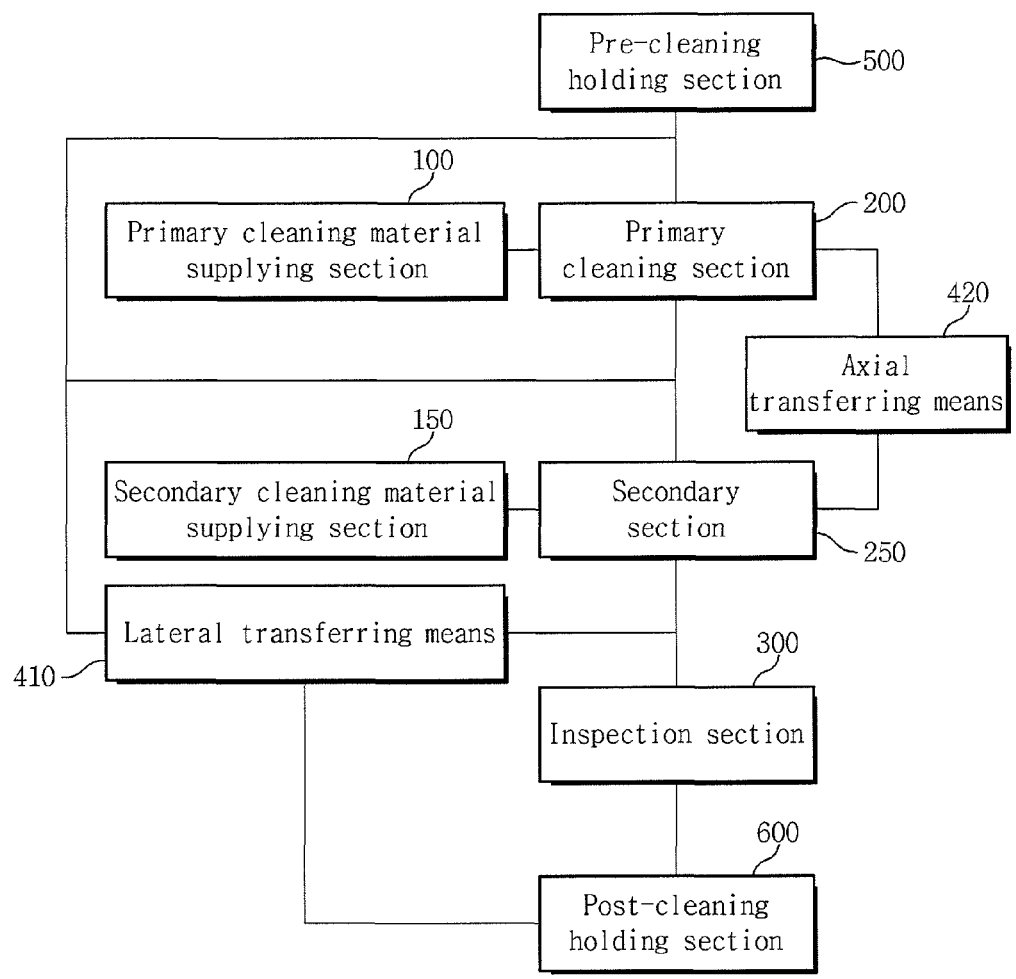
FIG. 6 is a flow chart of an automated cleaning apparatus for nuclear fuel-cladding tubes.

As illustrated in FIG. 6, the lateral transferring means 410 is positioned respectively between the pre-cleaning holding section 500 and the primary cleaning section 200, the primary cleaning section 200 and the secondary cleaning section 250, the secondary cleaning section 250 and the inspection section 300, the inspection section 300 and the post-cleaning holding section 600. In addition, the axial transferring means 420 is placed at the primary cleaning section 200 and the secondary cleaning section 250 respectively.

In addition, the present invention further includes a pre-cleaning holding section 500 made of a cladding tube guide where the cladding tubes are loaded before cleaning and wait for cleaning, and a post-cleaning holding section 600 made of a cladding tube guide where the cladding tubes are loaded after cleaning and wait for being transferred to the next process.

The sensor is positioned on the moving path of and the respective components and the cladding tube and thus detects approaching of the components and tubes to a proper position to send a signal to the control section. The sensor is well-known and commercialized and thus not illustrated in the figures.

The control section functions to control the movements of each component and cladding tube, and is constituted of a programmable logic controller (PLC) programmed with a control program, which receives a signal from the approach sensor and the optical sensor and sends a signal to each component. The PLC means a control means, and functions to control the automated process through the embedded program. The control section may employ a common controller generally commercialized and thus not particularly illustrated.

As described above, the individual components of the invention has been explained. Hereinafter, the operation between the components will be explained, referring to the embodiments of the invention. FIG. 6 is a flow chart explaining the operation of the components of the invention.

A cladding tube to be cleaned is loaded onto the pre-cleaning holding section 500. Then, the cladding tube slides down along the plate of the inclined tube guide 414 in the transferring direction of cladding tube until it stops by the next plate.

The stopped cladding tube is to be put onto the next step in order to be transferred to the cleaning section 200. At this time, if the cladding tube approaches a predetermined position, it is sensed by the approach sensor. The PLC sends a signal to start the motor 411 of the cam device 415. The cam 412 is rotated by motor rotation of the cam device 415, and then the follower 413 interlocked with the cam moves to the top dead point from the lowest dead point. Thus, the follower 413 ascends.

In FIGS. 4a and 4b, the follower 413 is provided with three blocks attached to its extension. The blocks ascend simultaneously with ascending of the follower 413. The blocks are positioned under the step between the plates of the tube guide 414 and ascend to push upwardly the cladding tube stopped by the step. At this time, the area of the block is barely enough to push up a singe cladding tube. Thus, a single cladding tube is made to be loaded onto the next plate and the single cladding tube slides down along the slope of the next plate.

The cladding tube slides down to the next step. At this time, the next step is located on the extension of the primary cleaning section 200 and provided with a groove formed to fit to the diameter of the cladding tube, which is then inserted to the groove. In this case, the follower 413 is not yet completely descended form the top dead point and thus the cladding tube is primarily blocked and stopped by the block connected with the follower. When the follower comes to place at the lowest dead point so that, among the three blocks, a block placed at the extension of the primary cleaning section 200 is descended, the cladding tube is configured to enter the groove. Then, the block descends not to affect the cladding tube.

When a cladding tube goes into the groove and then is detected by the approach sensor, the axial transferring means 420 is operated by means of a signal from the PLC. The axial transferring means, i.e., the gripper 421 arm, holds the cladding tube by the pneumatic cylinder, which supplies an air pressure to the gripper arm 422. The gripper 421 holding the cladding tube transfers the cladding tube to the cladding tube accommodation space 209 of the fixed frame 204 by means of the pneumatic cylinder connected to the gripper body. The cladding tube stops at the accommodation space 209 of the fixed frame 204, which is the cleaning position.

The cleaning material 10 is stored in the storage container 111 of the cleaning material automatic supplying device 110 of the primary cleaning material supplying section 100. The piezoelectric element, which is attached to the lower portion of the storage container 111, is made of fine ceramics using titanate and zirconate as main constituents, and has a piezoelectric effect where voltage and frequency change causes bending of a material. Thus, when applying a change in voltage and frequency, the piezoelectric element 112 oscillates and the storage container 111 also vibrates. Here, the piezoelectric element may employ a commercialized well known one.

As illustrated in FIG. 2c, the cleaning material 10 is configured to move due to vibration of the storage container 111 and be loaded onto the aligning passageway, which is formed in a spiral form along the inner wall face of the storage container 111. Since the aligning passageway is also attached to the storage container, it vibrates. Due to the vibration of the aligning passageway, the cleaning material 10 ascends in the spiral form along the aligning passageway while pushing to each other. At this time, although not illustrated, a classification step is disposed at the end portion of the aligning passageway. Thus, a cleaning material 10, not aligned, is made to be blocked by the step and dropped into the storage container, thereby achieving uniform alignment.

The cleaning material 10, passing through the aligning passageway 113, enters in the aligned form the one-line supply device 114 connected to the aligning passageway, and then enters the cleaning material transferring device 120 in one line.

As illustrated in FIG. 2d, the cleaning material transferring device 120 is provided with an advancer 121 having an accommodation space, of which width has an appropriate size and shape to receive a single cleaning material. Thus, the cleaning material supplied from the one-line supplying device 114 is accommodated into the accommodation space and transferred to the fixed frame 204 of the cleaning section 200 by means of the advancer 121, which is advanced by air pressure supplied from the pneumatic cylinder. If a cladding tube reaches the cleaning position and is detected by the approach sensor, the cleaning material transferring device 120 transfers the cleaning material 10 according to a signal from the PLC.

The cleaning solution is stored inside of the storage container 131 and flows through the flow tube 132 into the cleaning solution injection hole formed at the fixed frame 204. The amount of solution is appropriately controlled by means of a control valve 133.

With the transferred cleaning material 10 received in the accommodation space of the advancer 121, if the air gun of the primary cleaning section 200 advances by 10~20 mm by the pneumatic cylinder 203, the cleaning material 10 is pushed by the air gun and enters into the cleaning material accommodation space 208 of the fixed frame 204. Then, the cleaning material is made to be wet by the cleaning solution supplied from the cleaning solution injection hole connected to the upper portion of the accommodation space 208.

As shown in FIGS. 3a and 3b, with the air gun 201 advanced by the pneumatic cylinder 203, if the pneumatic cylinder 202 supplying an ejecting air pressure injects an air pressure, the air gun ejects air through a nozzle. The cleaning material facing the air gun nozzle is ejected by the air pressure.

The cleaning material accommodation space 208 of the fixed frame 204 and the cladding tube accommodation space 209 are connected to each other on the same axis. Thus, the ejected cleaning material passes through the cladding tube accommodation space and enters into the cladding tube. The air pressure supplied to the cleaning material is sufficient for the cleaning material to pass through the cladding tube. Therefore, the cleaning material can pass through the cladding tube and enter into the ink foam recovery barrel 207 facing the end portion of the cladding tube, thereby completing the primary cleaning of a cladding tube.

Upon completion of the primary cleaning, the cladding tube is turned by retracting of the gripper 421 to a position of before transferring to the cladding tube accommodation space 209 of the fixed frame 204. Then, the gripper releases the cladding tube. The cladding tube, resting on the groove of the afore-mentioned step, ascends from the groove by ascending of the block connected with the follower 413 according to the operation of the cam device 415, and then goes onto the stage, which lies on the extension of the primary cleaning section 200.

The cladding tube, moved onto the stage, slides down along the inclined plate, and proceeds to a stage placed on the extension line of the secondary cleaning section 250. In addition, the stage, placed on the extension line of the secondary cleaning section, is provided with a groove. As described above, the cladding tube is inserted into the block and stopped, and then, when the block drops, enters into the groove. Similarly to the primary cleaning section 200 as previously mentioned, the cladding tube is transferred to the fixed frame 204 by the gripper 421.

As in the primary cleaning material supplying section 100, the cleaning material 10 is transferred along the aligning passageway 113 from the storage container 111, and then, via the one-line supplying device 114, is accommodated in the accommodation space of the cleaning material transferring device 120 one by one. The cleaning material is transferred to the fixed frame 204 by means of the cleaning material transferring device 120 and pushed into the cleaning material accommodation space 208 by advancement of the air gun 201.

However, dissimilar to the primary cleaning material supplying section 100, the secondary cleaning material supplying section 150 includes no cleaning solution supplying device 130 and thus a cleaning material remains dried due to no supply of cleaning solution. Thus, the cleaning material 10 is ejected by the air gun 201 and enters into a cladding tube accommodated in the cladding tube accommodation space 209 of the fixed frame, without being wet by cleaning solution. Then, the cleaning material passes through the cladding tube to enter into the ink foam plug recovery barrel 207.

The cladding tube, cleaned with the dried cleaning material, is returned by retraction of the gripper 421. If the gripper releases the cladding tube, the cam device 415 is restarted such that the cladding tube goes onto the stage by ascending the block connected to the follower 413 and slides down along the inclined plate of the tube guide 414.

During transferring in lateral direction, the cladding tube is stopped by a stopper of the inspection device 300. The stopper can move up and down by means of a pneumatic device and functions to stop a cladding tube. Thus, the cladding tube, is stopped at the intermediate of the inclined path by an ascended stopper and the inside of the cladding tube, is inspected by means of an optical sensor. At this time, in case where a cleaning material remains inside of the cladding tube, the optical sensor detects it and sends a signal to interrupt the entire process. The residual cleaning material is removed manually and the whole process restarts. However, where the cladding tube passes the optical sensor inspection, the stopper descends and the cladding tube continues to slide down along the slope and is loaded onto the post-cleaning holding section 600.

Thereafter, the cleaned and load cladding tube proceeds to the next process manually and/or automatically. According to the present invention, which is operated through the above apparatuses, a cladding tube is primarily cleaned using a wet cleaning material and secondarily using a dry cleaning material to completely remove stains or moisture inside of the cladding tube. In addition, these processes are automated to enable to carry out rapid cleaning of cladding tubes.

In addition, a method of automatically cleaning nuclear fuel cladding tubes according to the invention includes the following processes.

The automated cleaning method of the invention includes a cleaning material preparation process being carried out in a cleaning material supplying section 100 where a cleaning material is automatically aligned and transferred; and a cleaning process being carried out in a cleaning section 200 where the automatically transferred cleaning material is moved into a cleaning position and the cleaning material is ejected by means of an air gun 201 to clean a cladding tube. The method further comprises an inspection process for inspecting the cleaned state of cladding tube and whether a cleaning material remains in the cladding tube. The inspection process is carried out after the cladding-tube cleaning process.

In the method of the invention, the cleaning material preparation process and the cleaning process includes respectively a primary cleaning material preparation process and a secondary cleaning material preparation process, and a primary cleaning process and a secondary cleaning process. Here, the primary cleaning material preparation process, the primary cleaning process, the secondary cleaning material preparation process, and the secondary cleaning process are carried out in sequence.

The primary cleaning material preparation process includes the steps of aligning a cleaning material stored, transferring the cleaning material into a cleaning solution supplying device, and soaking the cleaning material into the cleaning solution to prepare a wet cleaning material.

In the primary cleaning process, the cleaning material supplied from the primary cleaning material preparation process is ejected by air pressure from an air gun and passes through the inside of a cladding tube to thereby clean the inside of the cladding tube. This process is the most important cleaning process to remove stains or foreign matters inside of the cladding tube.

The secondary cleaning material preparation process includes the steps of aligning a cleaning material, transferring the cleaning material into a cleaning solution supplying device, and not soaking the cleaning material into the cleaning solution to prepare a dry cleaning material. Therefore, this process is similar to the primary cleaning material preparation process, except for providing a drive cleaning material.

In the secondary cleaning process, the cleaning material prepared in the secondary cleaning material preparation process is ejected into the cladding tube, which is transferred after being cleaned from the primary cleaning process, using an air pressure, thereby cleaning the inside of the cladding tube with a dry cleaning material. The second cleaning process is of great importance in that it performs a complete removal of moisture from inside the cladding tube.

A cladding tube finished with the secondary cleaning process is transferred again to go through an inspection process. The inspection process uses an optical sensor to inspect the inside of the cleaned cladding tube to check whether a cleaning material remains inside of the tube. In the inspection process, the cladding tube is transferred to next process if no cleaning material remains inside of the cladding tube. If a cleaning material remains inside of the cladding tube, the operation of the cladding-tube automatic cleaning apparatus is interrupted and the remaining cleaning material is removed. Then, the apparatus is restarted to transfer the cladding tube to next process. Therefore, the cleanliness of a cladding tube can be maintained at a higher level through this process. This process is automated and thus inconvenience caused by manual work can be eliminated.

The above process includes a primary cleaning material preparation process, a primary cleaning process, a secondary cleaning material preparation process, a secondary cleaning process, and an inspection process in the described order, all of which are automated.

As described above, in the apparatus for and the method of automatically cleaning cladding tubes according to the invention, the inside of a cladding tube is automatically cleaned, without manual operation, through a cleaning material preparation process and a cleaning process using a cleaning material supplying section for automatically supplying the cleaning material and a cleaning section for automatically cleaning the cladding tube.

In addition, according to the invention, after cleaning, the cladding tube is inspected through an inspection section as to whether any cleaning material remains inside of the cladding tube. Thus, the cleanliness of the tube can be maintained at a higher level. The remaining cleaning material can be easily checked out.

Furthermore, during the cladding-tube cleaning process, the cladding tube is automatically transferred between the devices by means of a lateral transferring means, an axial transferring means and so on. Thus, all the cleaning work can be done through one procedural step, thereby improving the work efficiency and preventing diseases in the musculoskeletal systems due to manual operation.

Consequently, the automation according to the invention reduces the process time considerably, improves the productivity, and eliminates concerns on the musculoskeletal diseases by manual operation.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for performing an automated cleaning of nuclear fuel cladding-tubes, the apparatus comprising:
   a cleaning material supplying section having a cleaning material automatic supplying device for automatically aligning and supplying a cleaning material, a cleaning material transferring device connected to the cleaning material automatic supplying device at its terminal end and configured to transfer the cleaning material supplied from the cleaning material supplying device into a cleaning section, and a cleaning solution supplying device configured to spray a cleaning solution to the cleaning material transferred by the cleaning material transferring device;

wherein the cleaning section includes an air gun configured to eject the cleaning material transferred by the transferring device by a pneumatic pressure blast from a nozzle, a first pneumatic cylinder fixed to the air gun and connected to an inlet hole of the air gun by using a tube for supplying air pressure to the air gun, a second pneumatic cylinder connected with the first pneumatic cylinder and configured to transfer the first pneumatic cylinder and the air gun, and a fixed frame facing an end of the air gun and having an accommodation space configured to receive the ejected cleaning material and a cladding-tube, wherein the cleaning solution supplying device is connected with an upper side of the fixed frame, and the cleaning material transferring device transfers the cleaning material to a position between the accommodation space of the fixed frame and the end of the air gun, and wherein the cleaning material automatic supplying device includes a storage container, a piezoelectric element attached to the bottom of the storage container, an aligning passageway formed in an inclined spiral form along the inner wall face of the storage container, and a one-line supply device connected with the aligning passageway to supply in one row a cleaning material coming from the storage container.

2. The apparatus according to claim 1, wherein the cleaning material transferring device includes:
   an advancer connected with an end portion of the cleaning material automatic supplying device and having an internal accommodation space for accommodating the cleaning material supplied from the cleaning material supplying device; and
   a pneumatic cylinder connected to an end of the advancer to move the advancer forward and backward.

3. The apparatus according to claim 1, wherein the cleaning solution supplying device includes a cleaning solution storage barrel, a flow tube connected to a lower portion of the cleaning solution storage barrel to spray the cleaning solution from the storage barrel to the cleaning material, and a control valve connected onto the path of the flow tube and configured to control an amount of the cleaning solution supplied to the cleaning material.

* * * * *